US008150192B2

(12) United States Patent
Niemeyer et al.

(10) Patent No.: US 8,150,192 B2
(45) Date of Patent: Apr. 3, 2012

(54) SYSTEM AND METHOD FOR FEATURE SCORE MAPPING AND VISUALIZATION OF MEDICAL IMAGES

(75) Inventors: Tanya L. Niemeyer, Seattle, WA (US); Paul V. Budak, Sammamish, WA (US); Brian W. Epps, Bainbridge Island, WA (US); James J. Boisseranc, Snohomish, WA (US)

(73) Assignee: Merge Cad Inc., Bellevue, WA (US)

( * ) Notice: Subject to any disclaimer, the term of this patent is extended or adjusted under 35 U.S.C. 154(b) by 1078 days.

(21) Appl. No.: 11/944,338

(22) Filed: Nov. 21, 2007

(65) Prior Publication Data

US 2008/0130970 A1    Jun. 5, 2008

Related U.S. Application Data

(60) Provisional application No. 60/867,370, filed on Nov. 27, 2006.

(51) Int. Cl.
*G06K 9/44* (2006.01)
(52) U.S. Cl. .................. 382/256; 382/128; 382/209
(58) Field of Classification Search .................. 382/128, 382/130, 131, 132, 209, 219
See application file for complete search history.

(56) References Cited

U.S. PATENT DOCUMENTS

| 5,969,524 | A  | * | 10/1999 | Pierpaoli et al. | 324/307 |
|---|---|---|---|---|---|
| 6,205,347 | B1 | * | 3/2001 | Morgan et al. | 600/407 |
| 6,339,223 | B1 | * | 1/2002 | Motomura et al. | 250/363.07 |
| 6,490,476 | B1 | * | 12/2002 | Townsend et al. | 600/427 |
| 6,642,716 | B1 | * | 11/2003 | Hoogenraad et al. | 324/309 |
| 6,941,166 | B2 | * | 9/2005 | MacAdam et al. | 600/521 |
| 6,992,484 | B2 | * | 1/2006 | Frank | 324/307 |
| 7,056,179 | B2 | * | 6/2006 | Courtney | 441/90 |

(Continued)

FOREIGN PATENT DOCUMENTS

WO    WO 2006/119340 A2    11/2006

OTHER PUBLICATIONS

Timothy M. Sawyer; System for Quantifying Treatment-induced Image Change, and for Integrating Quantified Change into Cancer Treatment-related Decision-making and Diagnosis; RSNA presentation Nov. 30, 2005; US.

*Primary Examiner* — Yosef Kassa
(74) *Attorney, Agent, or Firm* — Michael Best & Friedrich LLP

(57) ABSTRACT

A system to collect and analyze medical image data is applicable for multi-modality medical imaging systems, such as x-ray, MRI, and the like. Medical image data is collected and analyzed to determine one or more regions of interest. A selected region of interest is further analyzed to determine morphological characteristics. A feature library, which may be in the form of a data base, is used to analyze the image on a pixel-by-pixel basis to determine the degree to which the region of interest matches selected morphological characteristics, such as shape or margin. The resultant data is used to generate a map indicating a continuum over which the region of interest matches the morphological characteristics. A display receives the map data and applies it to the video image to thereby provide the user with a visualization of the degree to which the region of interest matches the morphological characteristics.

39 Claims, 4 Drawing Sheets

U.S. PATENT DOCUMENTS

| | | |
|---|---|---|
| 7,354,736 B2 * | 4/2008 | Wallach et al. .............. 435/69.1 |
| 7,593,562 B2 | 9/2009 | Harrington et al. |
| 7,660,448 B2 | 2/2010 | Collins et al. |
| 7,756,317 B2 | 7/2010 | Huo et al. |
| 7,787,682 B2 | 8/2010 | Collins et al. |
| 2004/0086158 A1 | 5/2004 | Leichter et al. |
| 2005/0074149 A1 | 4/2005 | Niemeyer |
| 2006/0212317 A1 | 9/2006 | Hahn et al. |

* cited by examiner

SYSTEM AND METHOD FOR FEATURE SCORE MAPPING AND VISUALIZATION OF MEDICAL IMAGES

CROSS REFERENCE TO RELATED APPLICATION

This application claims priority benefit of provisional application Ser. No. 60/867,370 filed Nov. 27, 2006, the content of which is incorporated in its entirety.

BACKGROUND OF THE INVENTION

1. Field of the Invention

The present invention is directed generally to feature score mapping and visualization in medical images and, more particularly, to a system and method for scoring morphological features of medical image data for display.

2. Description of the Related Art

The use of computers for the acquisition and generation of medical image data is well known. The use of computers to analyze medical image data is also well known. Computer aided diagnostic (CAD) systems are often used to analyze medical images to thereby identify unusual features. For example, CAD systems are to extract a set of morphological features from an image or set of images. These features are fed into a classifier processed to produce an indication of areas that are likely to be deemed malignant. For example, in mammography, CAD systems that have suspicious morphology are marked by an indicator on a visual display. However, the reason for these areas having suspicious morphology is often hidden from the user. That is, while a region may be marked by an indicator, the reasons underlying the decision to mark that region as suspicious are not readily discernable to the user. This has the disadvantage of not letting the user know why the area was suspicious. For example, it is unknown whether the area is suspicious because of shape, margin, or some combination of features. Therefore, it can be appreciated that there is a significant need for a system and method that provides feature score mapping and visualization to indicate morphological features and relevance to a user. The present invention provides this, and other advantages as will be apparent from the following detailed description and accompanying figures.

BRIEF DESCRIPTION OF THE SEVERAL VIEWS OF THE DRAWING(S)

DETAILED DESCRIPTION OF THE INVENTION

Figure 1:
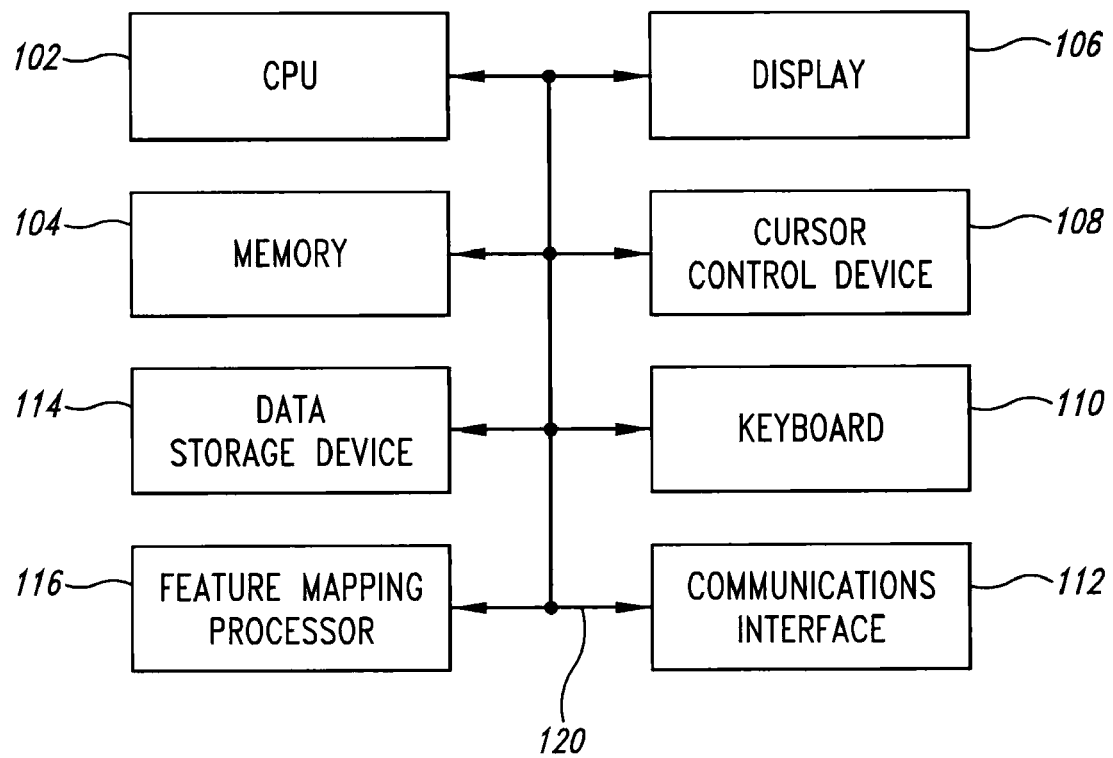
FIG. 1 is a functional block diagram of a system constructed in accordance with the present teachings.

The system described herein is implemented as part of a computer aided diagnostic (CAD) system 100, illustrated in the functional block diagram of FIG. 1. Many of the components illustrated in FIG. 1 are conventional in nature and are readily understood by those skilled in the art. The system 100 includes a central processing unit (CPU) 102 and a memory 104. The CPU may be implemented by a variety of known devices, such as a conventional microprocessor, microcontroller, application specific integrated circuit (ASIC) or the like. The system 100 is not limited by the specific implementation of the CPU 102.

Similarly, the memory 104 may be implemented using a variety of known devices, including dynamic memory, static memory, read only memory, programmable memory, or the like. In one embodiment, a portion of the memory 104 may be integrated into a single device with the CPU 102. The system 100 is not limited by the specific implementation of the memory 104. In general, the CPU 102 receives instructions and data from the memory 104 and executes those instructions.

The system 100 also includes conventional components, such as a display 106, a cursor control device 108, and a keyboard 110. The display 106 is typically a color display device, such as a video display, solid state display, or the like. The cursor control device 108 may be a mouse, trackball, or other form of conventional cursor control device. The keyboard 110 is a conventional component that may be coupled to the system 100 wirelessly (e.g., Bluetooth connection), via a cable (not shown) or integrated into a cabinet containing the CAD system.

FIG. 1 also illustrates a communications interface 112 that allows the system 100 to receive medical image data from an external source. Typically, the medical image data may be in the form of an X-ray, magnetic resonance image (MRI) data or the like. The system 100 is not limited by the specific form of the medical image data. The communications interface 112 is operatively coupled to a medical imaging device or an external data storage device containing the medical image data.

FIG. 1 also illustrates a data storage device 114, such as a magnetic disk drive, magnetic tape drive, optical storage device, or the like. The data storage device 114 may be used to temporarily store unprocessed medical image data received via the communications interface 112 and to further store processed data. The processed data may be shown on the display 106, or sent to a printer (not shown).

The system 100 also includes a feature mapping processor 116. As will be discussed in greater detail below, the feature mapping processor 116 provides feature score analysis and mapping to indicate to the user the degree to which an object of interest matches one or more features. Those skilled in the art will appreciate that some components of the functional block diagram of FIG. 1, such as the feature mapping processor 116, may actually be implemented as a series of computer instructions stored in the memory 104 and executed by the CPU 102. However, the feature mapping processor 116 is illustrated as a separate block in FIG. 1 because it executes a separate function.

The various components illustrated in FIG. 1 are coupled together by a bus system 120. Those skilled in the art will appreciate that the bus system 120 may include an address bus data bus, control bus, power bus, and the like. For the sake of convenience, the various buses are illustrated in FIG. 1 as the bus system 120.

The feature mapping processor 116 analyzes an object of interest (sometimes referred to as a region of interest or a lesion) and calculates mapping scores for various features. The feature mapping processor 116 gives the user direct control to visualize the severity of certain features independently from one another.

The operation of the feature mapping processor 116 is analogous to stress modeling in a mechanical object. For example, a mechanical object such as a support beam in a bridge, is subject to various stresses. It is known in the art to apply stress modeling to the mechanical object to determine the point or points of maximum stress due to one or more external forces. A mapping of potential stresses is often displayed on the surface of the structural object, such as stress contour mapping on the support beam. This mapping allows the user to alter the characteristics of the support beam to assure that it will withstand the stresses imposed by the various external forces.

This stress modeling process can be translated to the medical world where various imaging modalities (e.g., X-ray or MRI) can be used to show a cancerous or precancerous lesion, abnormality, or disease of concern. The feature mapping processor 116 takes a border, area, an entire image, or a volume of interest, and applies a "map of suspicion." This map of suspicion provides feature scores across an entire continuum from less suspicious to more suspicious and is displayed for interpretation by the user. This is different from prior medical systems in which only features that surpass a predetermined threshold are displayed to indicate suspicious areas.

The feature mapping processor 116 also extracts features that describe the region of interest in the medical image. The features may be morphological in nature, such as the shape or margin of an area or kinetic in nature, such as areas that exhibit rapid uptake and washout of image contrast agent that may be injected into a patient during an MRI study. The feature mapping processor 116 calculates the mapping scores and applies the map of the particular feature over the object. The mapping may be applied in the form of a graphic overlay shown on the display 106. The mapping can be two-dimensional to indicate the mapping for a particular feature over an area, such as an image slice in an MRI study. Alternatively, the feature mapping processor 116 may provide a three-dimensional mapping to illustrate mapping data applied to a volume, such as may be found over a series of image slices in an MRI study. The mapping may also be applied to a border, an area, or a volume-specific region.

In an exemplary embodiment, the feature mapping processor 116 utilizes a feature library to characterize the morphological characteristics of a region of interest. A medical institution will often implement a training set of morphological characteristics to assist in the proper identification and classification of characteristics. For example, the American College of Radiology (ACR) developed a breast tissue assessment tool known as Breast Imaging-Reporting and Data System (BI-RADS) to aid in the identification and classification of morphological features of regions of interest in breast tissue. A medical institution may develop a set of medical images that correspond to the various BI-RADS classifications. These images can form a training set that is part of the feature library with images that correspond to different margins (e.g., smooth, irregular, spiculated) and shape (e.g., oval, round, lobular, and irregular) as well as other BI-RADS classifications.

Although a single institution may develop its own feature library based on medical image data in a limited training set, it is also possible to have a plurality of institutions develop a broader training set based on a collection of medical images from multiple institutions. Thus, the feature library may result from the collective efforts of multiple institutions.

The feature library may be conveniently stored in the data storage device 114 (see FIG. 1). The specific data structure (e.g., table, database, etc.) of the feature library is not critical to the satisfactory operation of the system. If the feature library is a resource shared by multiple institutions, it is possible that the feature library may be located on a server (not shown) remote from the system 100. In that event, the system 100 can access the remote server via the communications interface 112 in a conventional fashion.

A region of interest is identified or segmented using known techniques. Such techniques are shown, by way of example, in U.S. Pat. No. 7,251,374 which is assigned to the assignee of the present application. The user can select a region of interest for morphological analysis using the cursor control device 108 or keyboard 110 in a conventional manner.

The feature mapping processor 116 uses the feature library to determine the characteristics of the identified region of interest. Details of the characterization and display of results is provided below.

Figure 2:
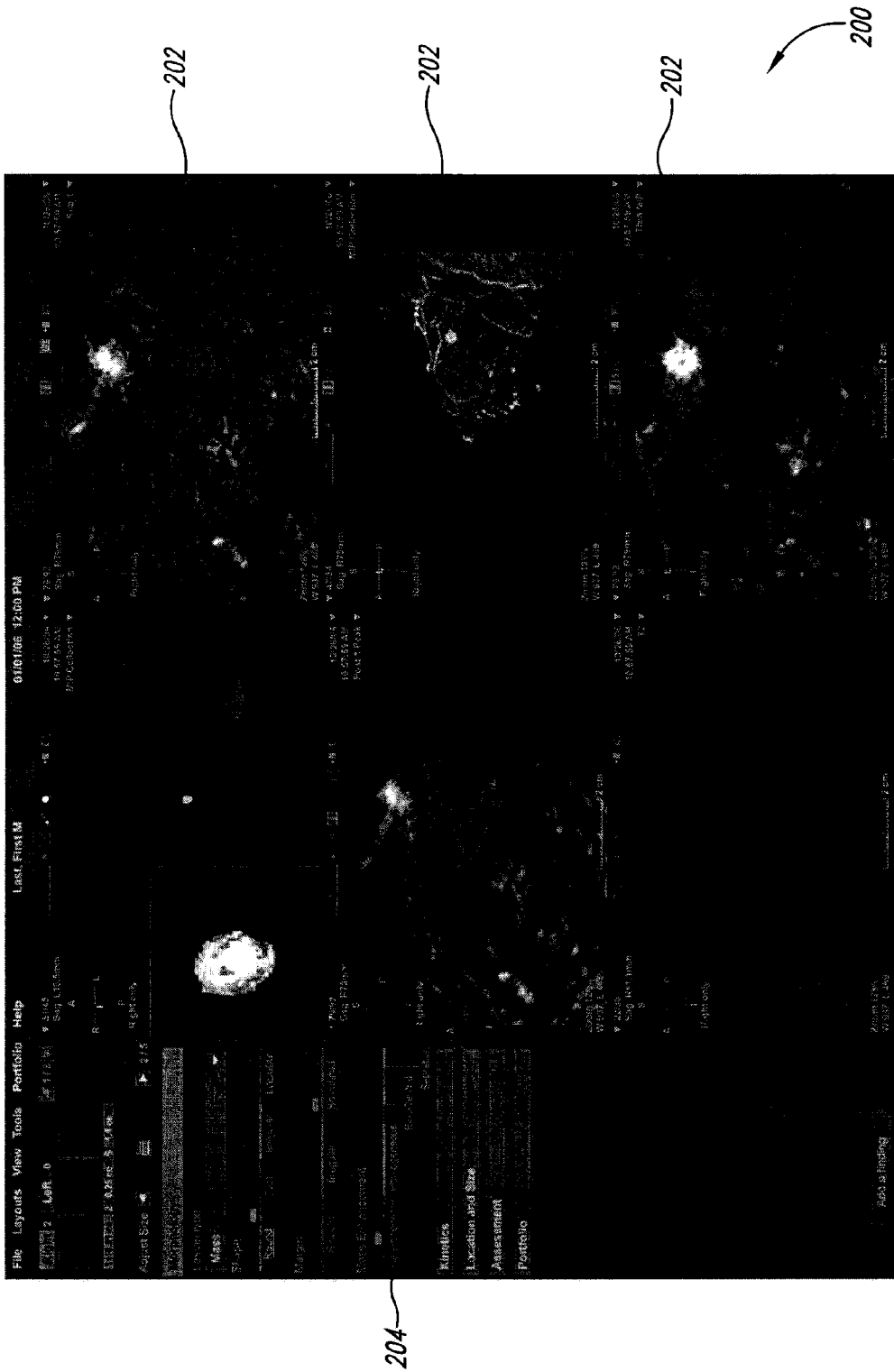
FIG. 2 is a sample screen display of medical image data and the selection of morphological features for scoring.

FIG. 2 is screen display 200 of multiple medical images 202 and a menu 204, such as may be shown on the display 106 (see FIG. 1). Although applicable to other anatomical regions, FIG. 2 illustrates MRI data of a breast. Typically, the margins of a lesion or region of interest are characterized as smooth, lobulated, irregular, and spiculated. Other margin categories are also known in the art. The feature mapping processor 116 can take each of these margin descriptors and determine an analytical score that describes the feature. The feature mapping processor then creates a map for the score range for the particular feature. The results may be shown in the display 106 (see FIG. 1) as a color gradient or color table that maps the feature to the score range.

For example, if the user were to examine the spiculation feature of a tissue of interest, the feature mapping processor 116 (see FIG. 1) would extract a margin for the region of interest or lesion and characterize each point on that margin with a spiculation score. Using that score, it is possible to derive a score range and then apply a color lookup table to indicate how likely areas of the lesions margin were spiculated and how likely they were not spiculated. Areas of high spiculation, for example, may have a high score and areas of no or low spiculation would have a relatively low score. To provide a visual image, the display 106 can display color images. A color lookup table can indicate how likely areas of a lesion's margin are spiculated and how likely they are not spiculated. For example, areas of high spiculation may be colored bright red and areas of no or low spiculation may have a lighter red to no red color.

The feature mapping processor 116 may create maps of each morphology feature and store the data in the data storage device 114. The mappings of each morphology feature may be toggled on and off interactively by the user for a particular volume rendering, surface rendering, or a border outline in two dimensions or in three dimensions. The user can apply these morphological feature space mappings to help make diagnostic decisions. Additionally, maps can be derived from multiple features to characterize certain morphological aspects of the lesion.

The feature mapping processor 116 (see FIG. 1) may optionally show a particular feature using a pulsation effect on the display 106. In this embodiment, a selected feature would pulse on the display 106 to get brighter or darker. In this manner, the underlying image may still be seen while the display pulses the feature on and off. This pulsation display may be used as an alternative to color intensity as an indication of feature mapping scores. For example, regions of interest that have a high mapping score can be colored bright red in one embodiment. In an alternative embodiment, the feature having a high mapping score may be pulsed to show a brighter area on the display 106. Areas of the lesion corresponding to a lower mapping score may be pulsed to a lower or darker intensity on the display 106.

Although it is sometimes possible to characterize features into specific categories (e.g., a shape feature being round or lobular), those skilled in the art will recognize that features often exist on a continuum rather than in a binary categorization. The system 100 allows for the display of a continuum of features. For example, a shape feature continuum might be round, oval, lobular, and irregular. The round shape feature tends to map to a more benign feature while an irregular feature maps to a more malignant feature with oval and lobular falling in between. With this continuum form of data analysis, the feature mapping processor 116 may create a color intensity scale or a pulsation scale to show the more malignant features stronger than the more benign features. In another example, illustrated in FIG. 2, the display 106 may show a continuum or feature scale for a lesion margin going from smooth to irregular and then to spiculated. As illustrated in the menu 204 of FIG. 2, the user can specify where the display 106 will illustrate a lesion that maps to the user selected feature. In the example of FIG. 2, the user has selected a mapping feature to illustrate only the spiculated features. The highlighted image in FIG. 2 illustrates those margins that map to the user selected mapping levels.

Also illustrated in the menu 204 is the user selection of shape mapping midway between round and oval shapes. Thus, the display mapping would illustrate those features corresponding to a mapping score midway between a round and oval shapes.

In yet another embodiment, the user can select multiple features for mapping display. For example, the display 106 (see FIG. 1) can illustrate where an object is most like a particular shape. For example, the display could use a two color scale with one color representing a round shape and a second color representing an irregular shape. The display 106 would then show the object colored with areas that match for roundness and areas that match for an irregular shape.

Thus, the user may readily toggle certain features on and off to illustrate why a particular object has been identified as suspicious. Using the example of FIG. 2, the user can click on the margin portion of the menu 204 to display margins of an object of interest that meet the user selected mapping. The user may then click on another feature, such as shape, to illustrate which portions of the object match the user selected mapping for that particular feature. Using the techniques described herein, the user can readily evaluate an object in two dimensions or three dimensions to readily determine what characteristics cause that object to be identified as suspicious. User selected features and mapping data may all be stored within the data storage device 114 in association with the processed medical image data for subsequent retrieval and further analysis.

Figure 3:
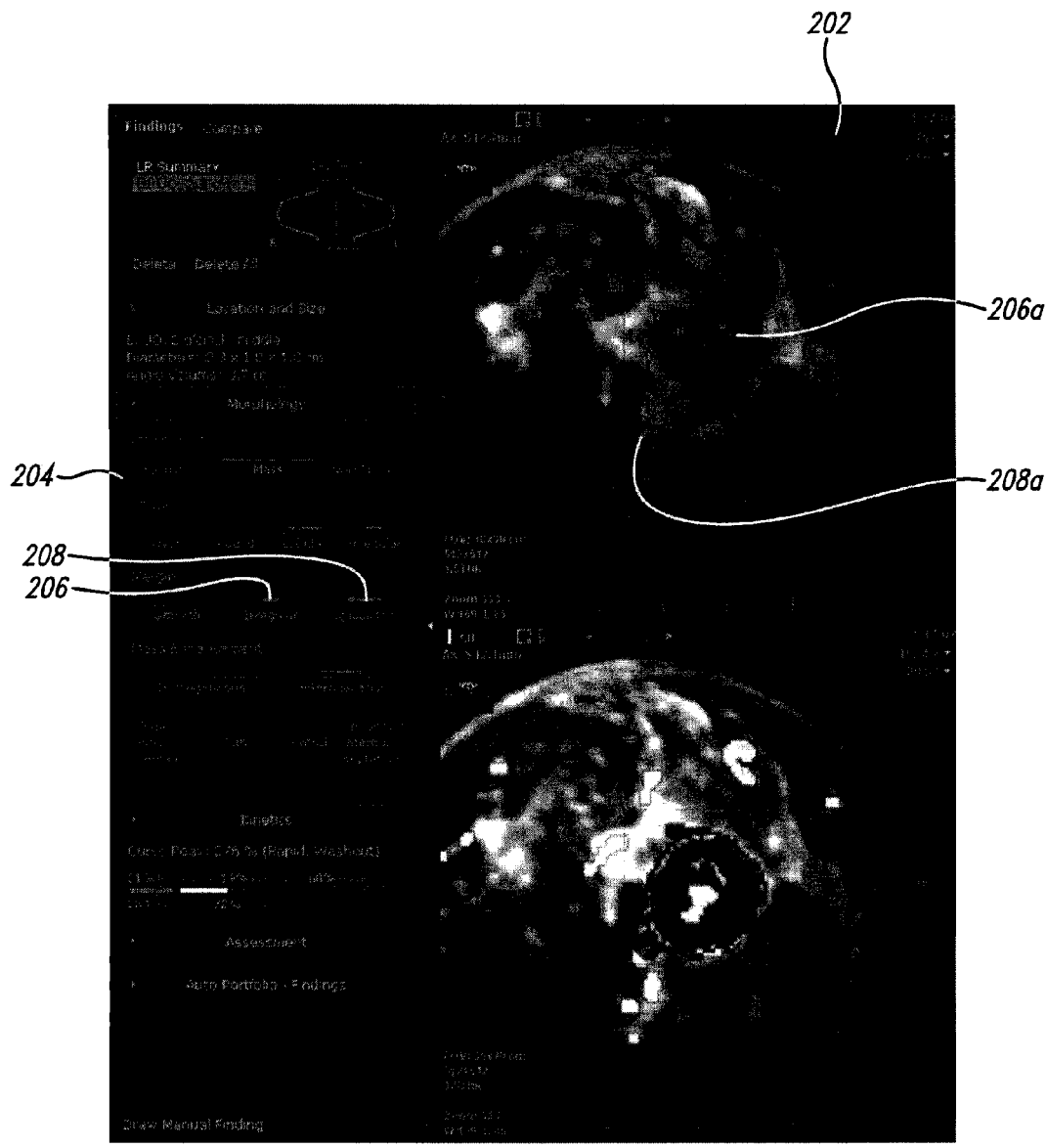
FIG. 3 is a sample screen display of medical image data and the selection of morphological features for scoring.

FIG. 3 illustrates additional medical images that illustrate mapping capabilities of the system 100. In the top image of FIG. 3, the margin of a region of interest is characterized. The menu 204 indicates the presence of irregular and spiculated margins. These two morphological characteristics are illustrated in the menu 204 using a first indicator 206, having a first color, to indicate the irregular margin, and a second indicator 208, having a second color, to indicate the spiculated margin. The medical image 202 includes a map showing irregular margins 206*a* and spiculated regions 208*a*. In an exemplary embodiment, the irregular margin region 206*a* is displayed with a color corresponding to the color of the first indicator 206 for easy identification. Similarly, the spiculated margin region 208*a* is displayed with a color corresponding to the color of the second indicator 208.

The menu 204 in FIG. 3 also illustrates a display indicative of the likelihood or confidence with which features have been characterized. For example, the length of the second indicator 208 is longer than the length of the first indicator 206. This indicates a higher level of confidence in the classification of the spiculated region 208*a* in the medical image 202 of FIG. 3. In an alternative embodiment, the length of the indicators (e.g., the indicators 206-208) could be used to indicate the relative amount of the particular feature shown in the medical image 202. For example, a long length of the indicator 206 compared with the length of the indicator 208 would indicate that more of the margin was categorized as irregular than spiculated. Those skilled in the art will appreciate that the examples of FIG. 3 relate to the margins of a region of interest in breast MR image data. The principles can be applied to other characteristics (e.g., shape) of the breast MR image data or to other morphological characteristics of a region of interest in another part of the body (e.g., prostate).

Figure 4:
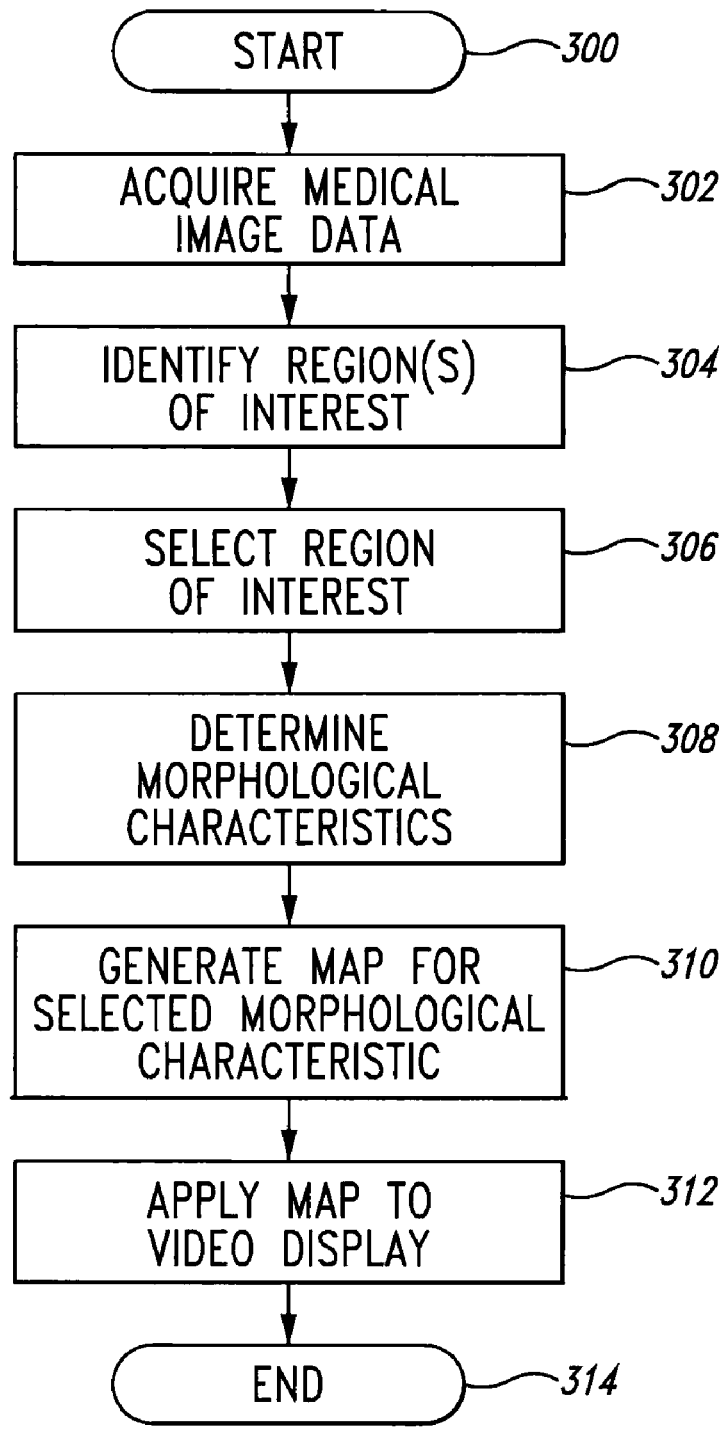
FIG. 4 is a flowchart illustrating the operation of the system of FIG. 1.

The operation of the system 100 is illustrated in the flow chart of FIG. 4. At a start 300 a medical facility utilizes image acquisition equipment, such as X-ray, MRI, and the like. At step 302, the system acquires medical image data. At step 304, the system identifies a region or regions of interest in the medical image data. As previously discussed, there are many known techniques by which data is analyzed to identify regions of interest. This process is sometimes referred to as data segmentation. The segmented data may be presented to a user, such as a physician, for further analysis.

In step 306, the user can select a particular region of interest for further analysis. Those skilled in the art will also appreciate that the system 100 can automatically analyze one or more regions of interest to determine morphological characteristics.

In step 308, the system 100 determines the morphological characteristics for the selected region of interest. As previously discussed, the feature mapping processor 116 (see FIG. 1) may utilize the feature library in the data storage device 114 to determine the degree of match between the selected region of interest and particular morphological characteristics. This may include, by way of example, classification of the overall shape, margin, and mass characteristics of the region of interest. As previously discussed, the feature mapping processor 116 may conveniently generate a map indicating the degree to which the region of interest matches the selected morphological feature. In one embodiment, the map is generated on a continuous basis to indicate the degree of match to a selected morphological characteristic on a continuuium. This varies from other techniques that show segmented data based only on the basis of surpassing some predetermined threshold.

In step 310, the feature mapping processor 116 generates the map for the selected morphological characteristic. In step 312, the system 100 applies the map to the display 106 to thereby to provide the user with a visual display of the degree to which the selected region of interest matches morphological characteristics.

As previously discussed, the map may be used in conjunction with the display 106 in a variety of different manners, such as varying color intensities to indicate the range of values corresponding to the degree of match. Alternatively, the system may apply a pulsating effect with greater pulsating intensities indicating a greater degree of match between the region of interest and the particular morphological characteristic. The process ends at 314.

Those skilled in the art will appreciate that other known processes may be included herein. For example, the math and other data generated by the system 100 may be conveniently stored in the data storage device 114 for subsequent retrieval and display. The results may also be transmitted, via the communications interface 112, to a remote terminal for display. The system 100 can also generate reports using a printer (not shown). The subsequent processes are within the scope of knowledge of one of ordinary skill in the art and need not be described in greater detail herein.

The examples provided herein relate to breast imaging and the morphological characterization of breast medical image data. Thus, the morphological characteristics in these examples correspond to the BI-RADS classification. However, the principles of the present invention are applicable to medical image data other than breast image data. For example, the ACR may develop classifications for other tissue areas, such as prostate, brain, liver, or other organs. For morphological classifications of other organs or tissue, the system 100 may rely on the classification scheme of organizations, such as the ACR. Alternatively, user-selected morphological characteristics, or classifications in accordance with industry standards can be used by the system 100.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A system comprising:
an input configured to receive medical image data, the medical image data including a region of interest;
a data storage structure to store the received medical image data;
a feature mapping processor configured to analyze the region of interest with respect to a plurality of morphological characteristics in each of a plurality of morphological categories, and to generate a morphological score along a continuum that maps substantially the entire region of interest to a score range indicative of a degree to which the region of interest matches the plurality of morphological characteristics in each of the plurality of morphological categories from a lesser degree of match to a greater degree of match; and
a display to display the medical image data, including the region of interest, the display including visual data indicative of the morphological score range across the continuum from less suspicious to more suspicious.

2. The system of claim 1 wherein the feature mapping processor is further configured to analyze the region of interest with respect to one of the plurality of morphological characteristics and to generate a morphological score on a continuum indicating the degree to which the region of interest matches the plurality of morphological characteristics from a lesser degree of match to a greater degree of match, the display being configured to provide visual data indicative of the continuum of morphological scores.

3. The system of claim 1 wherein the medical image data is a two-dimensional image represented by a plurality of pixels and the feature mapping processor is further configured generate a map having map elements corresponding to the pixels of at least a portion of the medical image data with each of the map elements having a data value representative of the morphological score for the corresponding pixel, the display being configured to display visual data based on the generated map.

4. The system of claim 1 wherein the medical image data is a three-dimensional image represented by a plurality of voxels and the feature mapping processor is further configured generate a map having map elements corresponding to the voxels of at least a portion of the medical image data with each of the map elements having a data value representative of the morphological score for the corresponding voxel, the display being configured to display visual data based on the generated map.

5. The system of claim 1 wherein the region of interest has a border portion and the feature mapping processor is further configured generate morphological score for the border portion.

6. The system of claim 1 wherein the region of interest has a two-dimensional area and the feature mapping processor is further configured generate morphological score for the region area.

7. The system of claim 1 wherein the region of interest has a three-dimensional volume and the feature mapping processor is further configured generate morphological score for the region volume.

8. The system of claim 1 wherein the region of interest comprises a portion of the medical image data less than the entire medical image and the feature mapping processor is further configured generate the morphological score for the entire medical image.

9. The system of claim 1 wherein the display is configured to show at least a portion of the visual data in color with different colors indicating the morphological score.

10. The system of claim 1 wherein the display is configured to show at least a portion of the visual data in color with different color intensity indicating the morphological score.

11. The system of claim 1 wherein the display is configured to show at least a portion of the visual data with a time-varying display brightness indicating the morphological score.

12. The system of claim 1, further comprising an input device operable by a user to select one of the plurality of morphological categories, the feature mapping processor being further configured to analyze the region of interest with respect to the plurality of morphological characteristics for the selected morphological category wherein the display displays the medical image data, including the region of interest, the display including visual data indicative of the morphological score for the selected morphological category.

13. The system of claim 1, further comprising a library of morphological characteristics wherein the feature mapping processor is further configured to for pattern recognition using the library of morphological characteristics to generate the morphological score.

14. The system of claim 1 wherein the medical image data is breast image data and the morphological characteristics correspond to ACR BI-RADS classifications.

15. The system of claim 1 wherein the morphological characteristics correspond to ACR classifications corresponding a tissue type for the region of interest.

16. A method for scoring features in medical image data comprising:
    receiving medical image data, the medical image data including a region of interest;
    analyzing the region of interest with respect to a plurality of morphological characteristics in each of a plurality of morphological categories;
    generating a morphological score along a continuum that maps substantially the entire region of interest to a score range indicative of a degree to which the region of interest matches the plurality of morphological characteristics in each of the plurality of morphological categories from a lesser degree of match to a greater degree of match; and
    displaying the medical image data, including visual data indicative of the morphological score range across the continuum from less suspicious to more suspicious.

17. The method of claim 16 wherein generating a morphological score comprises generating a morphological score on a continuum indicating the degree to which the region of interest matches the plurality of morphological characteristics from a lesser degree of match to a greater degree of match, wherein displaying the medical image data comprises generating visual data indicative of the continuum of morphological scores.

18. The method of claim 16 wherein the medical image data is a two-dimensional image represented by a plurality of pixels and generating a morphological score comprises generating a map having map elements corresponding to the pixels of at least a portion of the medical image data with each of the map elements having a data value representative of the morphological score for the corresponding pixel.

19. The method of claim 16 wherein the medical image data is a three-dimensional image represented by a plurality of voxels and generating a morphological score comprises generating a map having map elements corresponding to the voxels of at least a portion of the medical image data with each of the map elements having a data value representative of the morphological score for the corresponding voxel.

20. The method of claim 16 wherein the region of interest has a border portion and generating a morphological score comprises generating a morphological score for the border portion.

21. The method of claim 16 wherein the region of interest has a two-dimensional area and generating a morphological score comprises generating a morphological score for the region area.

22. The method of claim 16 wherein the region of interest has a three-dimensional volume and generating a morphological score comprises generating a morphological score for the region volume.

23. The method of claim 16 wherein the region of interest comprises a portion of the medical image data less than the entire medical image and generating a morphological score comprises generating a morphological score for the entire medical image.

24. The method of claim 16 wherein generating a morphological score comprises using pattern recognition to compare the region of interest to a feature library of morphological characteristics.

25. The method of claim 16 wherein the medical image data is breast image data and the morphological characteristics correspond to ACR BI-RADS classifications.

26. The method of claim 16 wherein the morphological characteristics correspond to industry-standard classifications corresponding a tissue type for the region of interest.

27. The method of claim 16 wherein the morphological characteristics correspond to user-selectable classifications corresponding a tissue type for the region of interest.

28. A non-transitory computer-readable medium containing instructions for scoring features in medical image data by causing a computer system to:
    receive medical image data, the medical image data including a region of interest;
    analyze the region of interest with respect to a plurality of morphological characteristics in each of a plurality of morphological categories;
    generate a morphological score along a continuum that maps substantially the entire region of interest to a score range indicative of a degree to which the region of interest matches the plurality of morphological characteristics in each of the plurality of morphological categories from a lesser degree of match to a greater degree of match; and
    display the medical image data, including visual data indicative of the morphological score range across the continuum from less suspicious to more suspicious.

29. The computer-readable medium of claim 28 wherein instructions to generate a morphological score comprises generating a morphological score on a continuum indicating the degree to which the region of interest matches the plurality of morphological characteristics from a lesser degree of match to a greater degree of match, and displaying the medical image data comprises instructions to generate visual data indicative of the continuum of morphological scores.

30. The computer-readable medium of claim 28 wherein the medical image data is a two-dimensional image represented by a plurality of pixels and instructions to generate a morphological score comprises generating a map having map elements corresponding to the pixels of at least a portion of the medical image data with each of the map elements having a data value representative of the morphological score for the corresponding pixel.

31. The computer-readable medium of claim 28 wherein the medical image data is a three-dimensional image represented by a plurality of voxels and instructions to generate a morphological score comprises generating a map having map elements corresponding to the voxels of at least a portion of the medical image data with each of the map elements having a data value representative of the morphological score for the corresponding voxel.

32. The computer-readable medium of claim 28 wherein the region of interest has a border portion and instructions to generate a morphological score comprises generating a morphological score for the border portion.

33. The computer-readable medium of claim 28 wherein the region of interest has a two-dimensional area and instructions to generate a morphological score comprises generating a morphological score for the region area.

34. The computer-readable medium of claim 28 wherein the region of interest has a three-dimensional volume and instructions to generate a morphological score comprises generating a morphological score for the region volume.

35. The computer-readable medium of claim 28 wherein the region of interest comprises a portion of the medical image data less than the entire medical image and instructions to generate a morphological score comprises generating a morphological score for the entire medical image.

36. The computer-readable medium of claim 28 wherein instructions to generate a morphological score comprises using pattern recognition to compare the region of interest to a feature library of morphological characteristics.

37. The computer-readable medium of claim 28 wherein the medical image data is breast image data and the morphological characteristics correspond to ACR BI-RADS classifications.

38. The computer-readable medium of claim 28 wherein the morphological characteristics correspond to industry-standard classifications corresponding a tissue type for the region of interest.

39. The computer-readable medium of claim 28 wherein the morphological characteristics correspond to user-selectable classifications corresponding a tissue type for the region of interest.

\* \* \* \* \*